Figure 1:
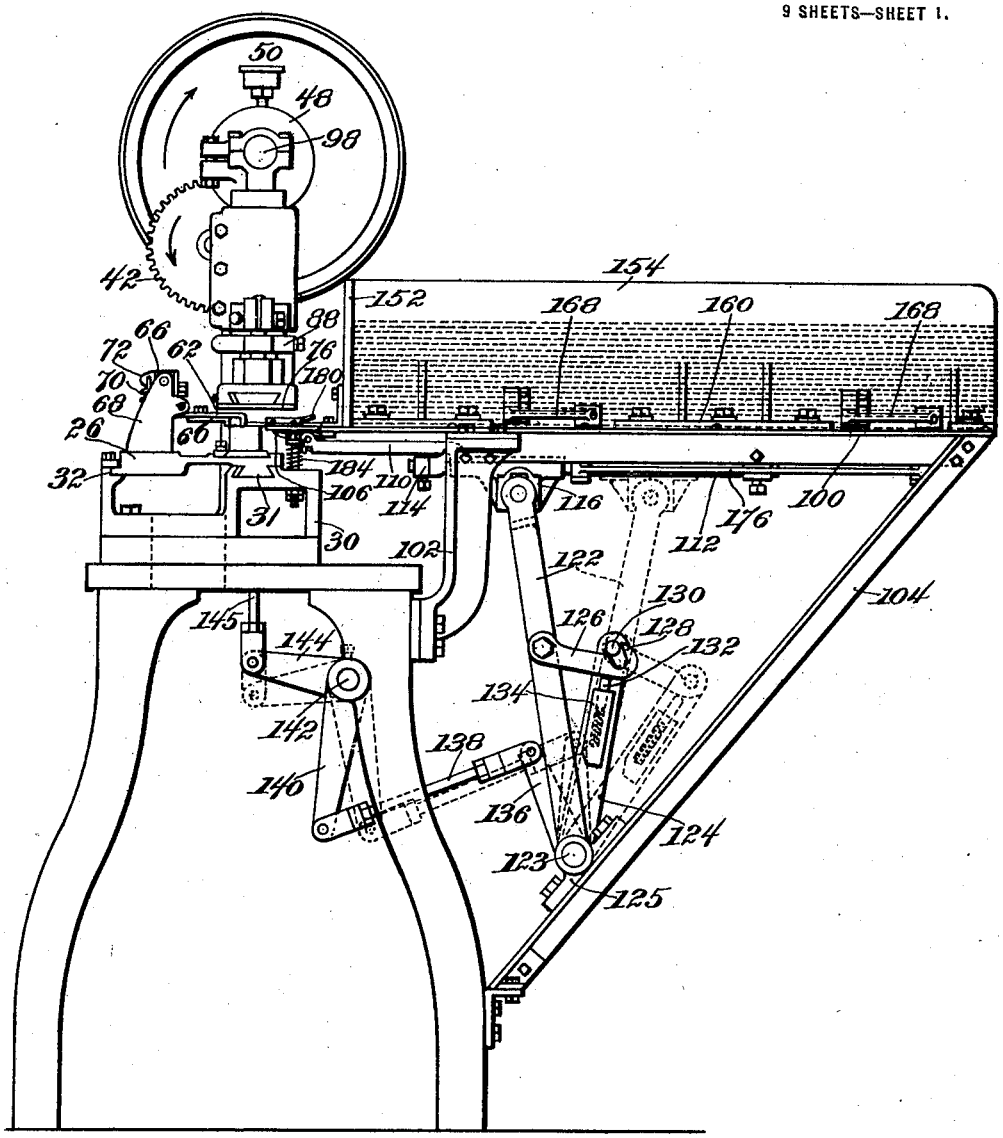

E. E. WINKLEY.
STOCK CUTTING MACHINE.
APPLICATION FILED APR. 7, 1916.

1,385,601.

Patented July 26, 1921.
9 SHEETS—SHEET 1.

Witness
Edward S. Day

Inventor
Erastus E. Winkley
by his attorneys
Phillips, Van Everen & Fish

E. E. WINKLEY.
STOCK CUTTING MACHINE.
APPLICATION FILED APR. 7, 1916.

1,385,601.

Patented July 26, 1921.

9 SHEETS—SHEET 8.

Witness
Edward S. Day

Inventor
Erastus E. Winkley
by his attorneys
Phillips, Van Everen & Fish

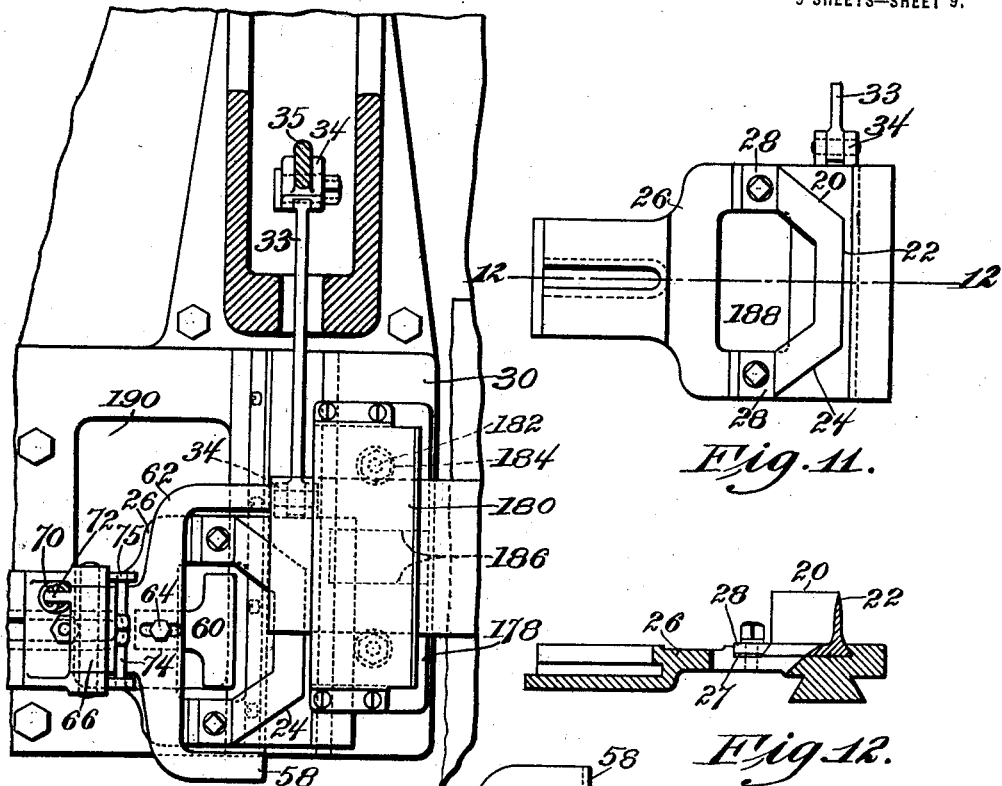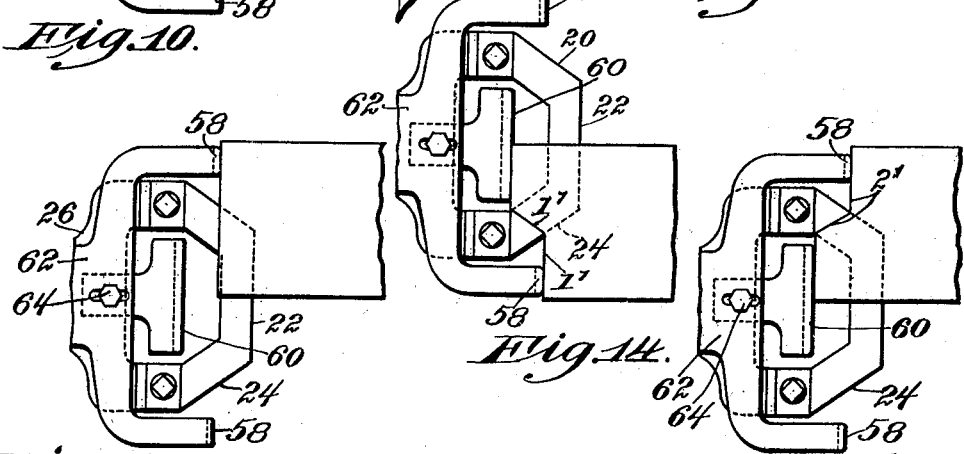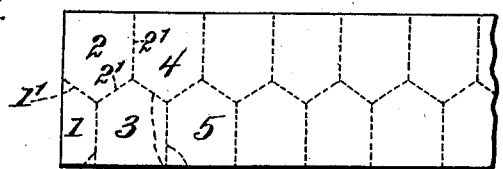

UNITED STATES PATENT OFFICE.

ERASTUS E. WINKLEY, OF LYNN, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

STOCK-CUTTING MACHINE.

1,385,601.  Specification of Letters Patent.  Patented July 26, 1921.

Application filed April 7, 1916. Serial No. 89,542.

*To all whom it may concern:*

Be it known that I, ERASTUS E. WINKLEY, a citizen of the United States, residing at Lynn, in the county of Essex and State of Massachusetts, have invented certain new and useful Improvements in Stock-Cutting Machines; and I do hereby declare the following to be a full, clear, and exact description of the invention, such as will enable others skilled in the art to which it appertains to make and use the same.

This invention relates to stock-cutting machines and more particularly to machines for cutting blanks for parts of boots and shoes from sheets or strips of shoe stock.

In the common practice of cutting heel lifts from sheet stock a closed D-shaped die is used which cuts lifts to approximately the shape they have in the finished shoe. The sheet of stock is generally intermittently fed across the die after each cut, preparatory to making the succeeding cut, and the cuts are made in rows. To obtain perfectly shaped lifts with a closed die, the cutting edge of the die must be spaced a material distance from the edge of the sheet, because the cutting edge of the die next to the edge of the sheet will make a bevel cut when there is no stock outside of its cutting edge to give resistance. Also difficulties of mechanical construction and operation of the feeding means have required an excess feed to insure a perfect blank. The material surrounding each cut constitutes a large percentage of the sheet and is all waste. When cutting with a closed die a separate die is required for cutting each of the different sizes and styles of lifts, so that a large number of dies must be employed with such a machine.

The primary object of the present invention is to provide a machine for cutting shoe stock into blanks, by which the stock may be cut into all desired sizes and styles of blanks without the usual waste of material.

In accordance with this object, one feature of the invention contemplates cutting a strip of stock of sufficient width to produce two rows of blanks, with a cutter which will form sides of contiguous blanks in both of the rows of blanks, and relatively moving the strip and cutter longitudinally and transversely between its cuts into such position as to complete the formation of any single blank at each second cut. In the preferred form of the invention the cutter is designed to form two series of intersecting cuts in the two marginal portions of the strip and is shifted transversely of the strip preparatory to each cut into proper position to alternately make a cut on each series. Simultaneously with shifting the cutter, the strip is advanced longitudinally, one-half the width of a blank, to position the stock for the completion of a blank at each cut.

Another object of the invention is to provide a shoe stock cutting machine by which different sizes of blanks can be produced by the same cutter.

In accordance with this object, another feature of the invention contemplates the provision in a machine for cutting shoe stock having a relatively movable cutter and cutting block for cutting blanks, of means to relatively move the cutter and stock transversely of the line of feed of the stock preparatory to making each cut, and means to vary the relative movement of the cutter and stock for cutting different sizes of blanks.

In the preferred form of the invention the cutter has three connected straight faces arranged to have the shape of a truncated V or semi-hexagon. The faces forming the two angles of the cutter are much longer than that required to cut the side of the largest blank, and the transverse shifting movement of the cutter is controlled to accurately locate the apex of the angles when making the cuts. The apex of each angle is shifted varying distances from each side of the center line of the strip in cutting different sizes of blanks. The stock is fed to the cutter by an intermittent feeding means, and in order to insure against an over-feed, stops are placed in front of the cutter to positively stop the advancement of the stock at a predetermined distance from the cutter. The feeding means advances the stock one-half the width of a blank for each cutting operation, and to provide for cutting different sizes of blanks, the stops are adjustable relatively to the cutter.

Another object and feature of the invention relates to the improvement of machines for operating upon stock in which the strips of stock are stacked in a magazine in superposed relation and are fed successively from the bottom of the stack in a series of steps and one at a time to the operating instrumentality.

To the accomplishment of the above objects and such others as may hereinafter appear, as will be apparent to those skilled in the art, the invention comprises the features of construction and combinations of parts hereinafter described in their preferred form and arrangement and then set forth in the appended claims.

Figure 2:
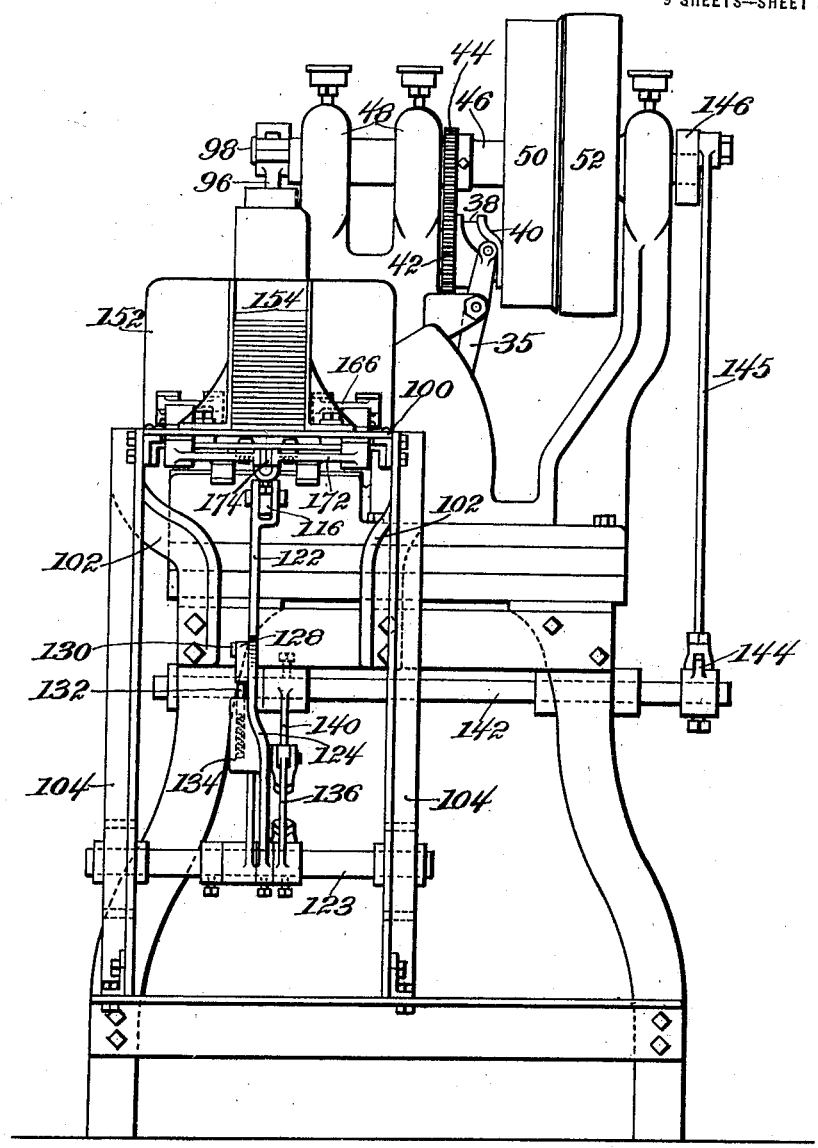
Figure 3:
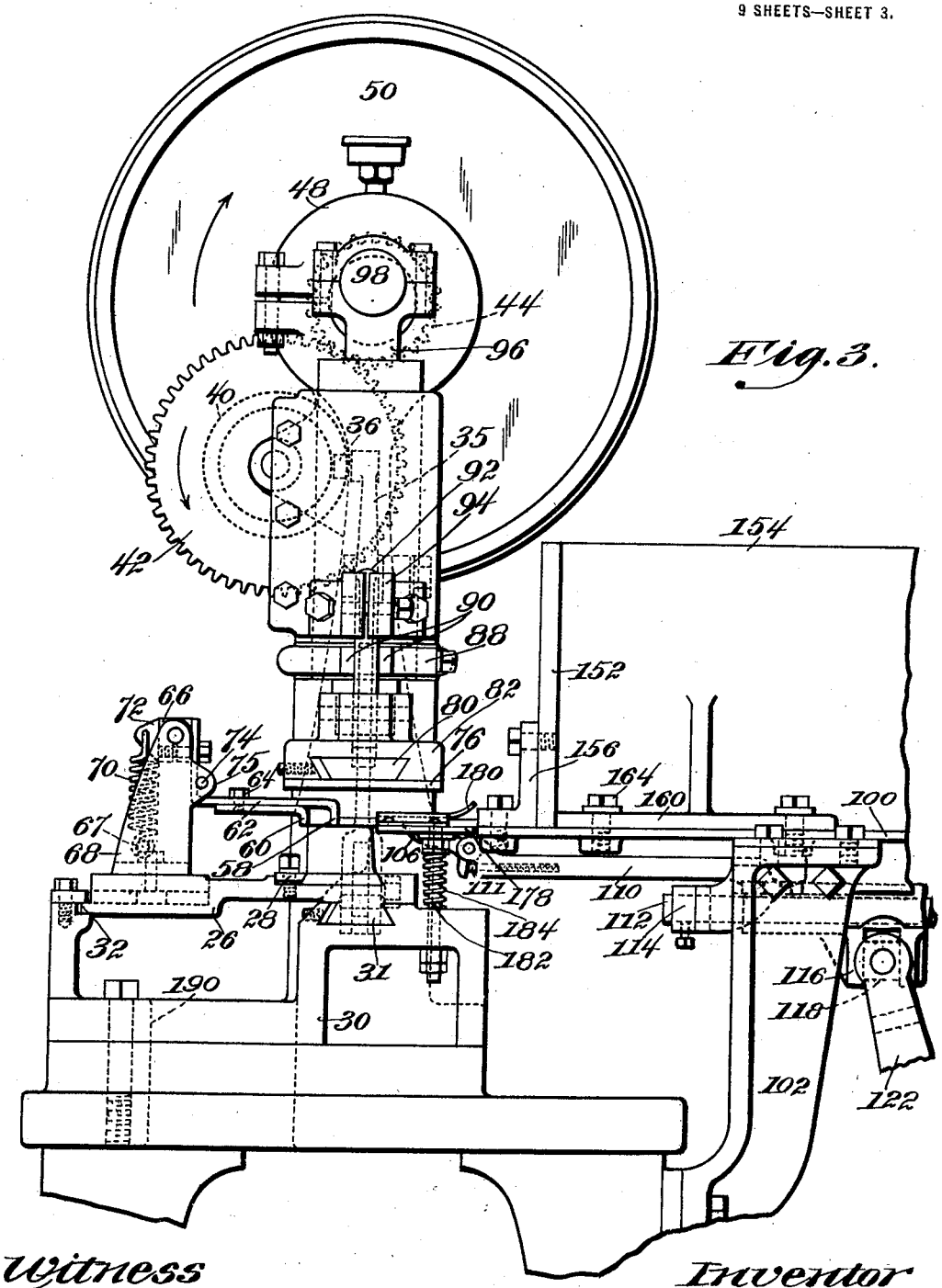
Figure 4:
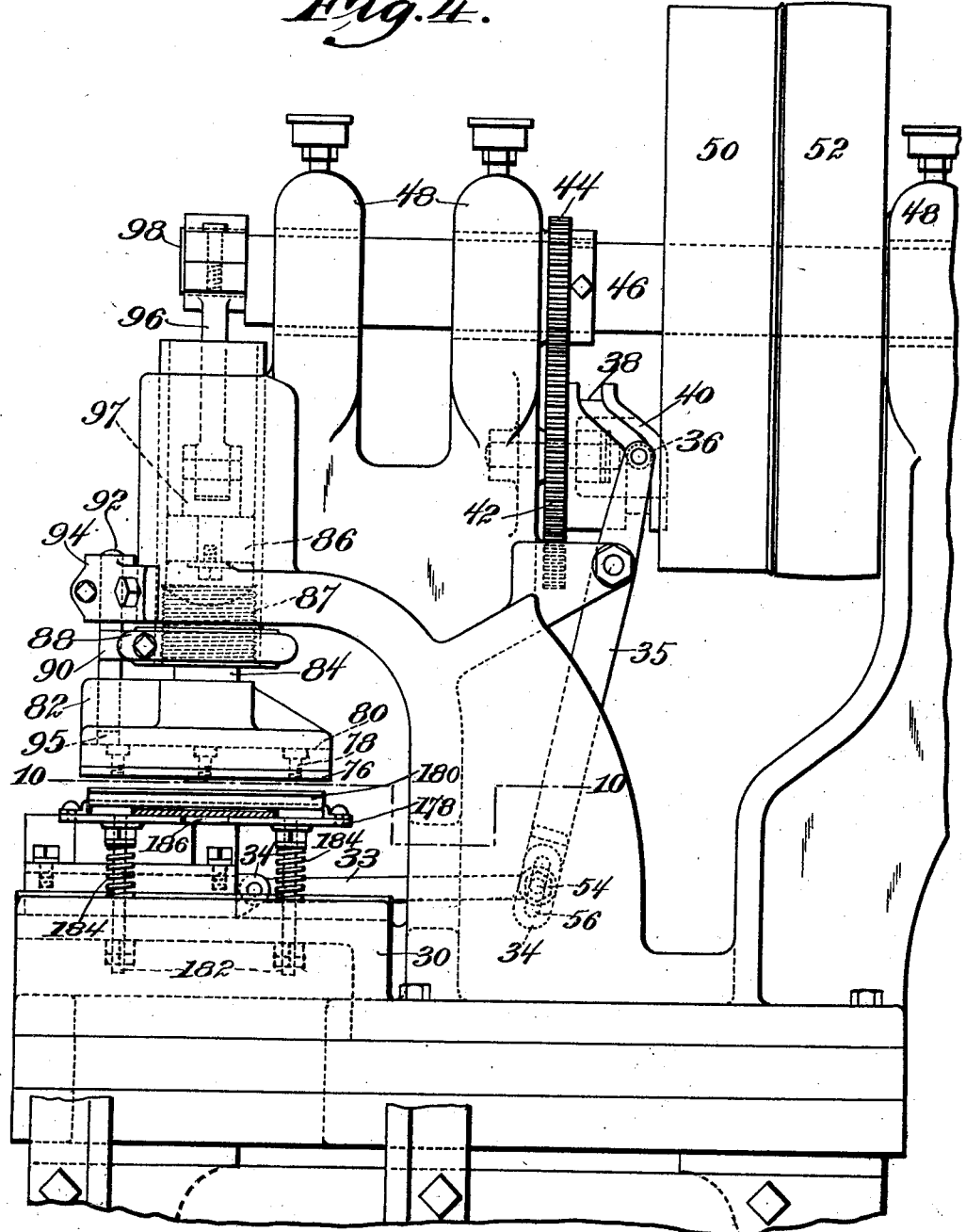
Figure 5:
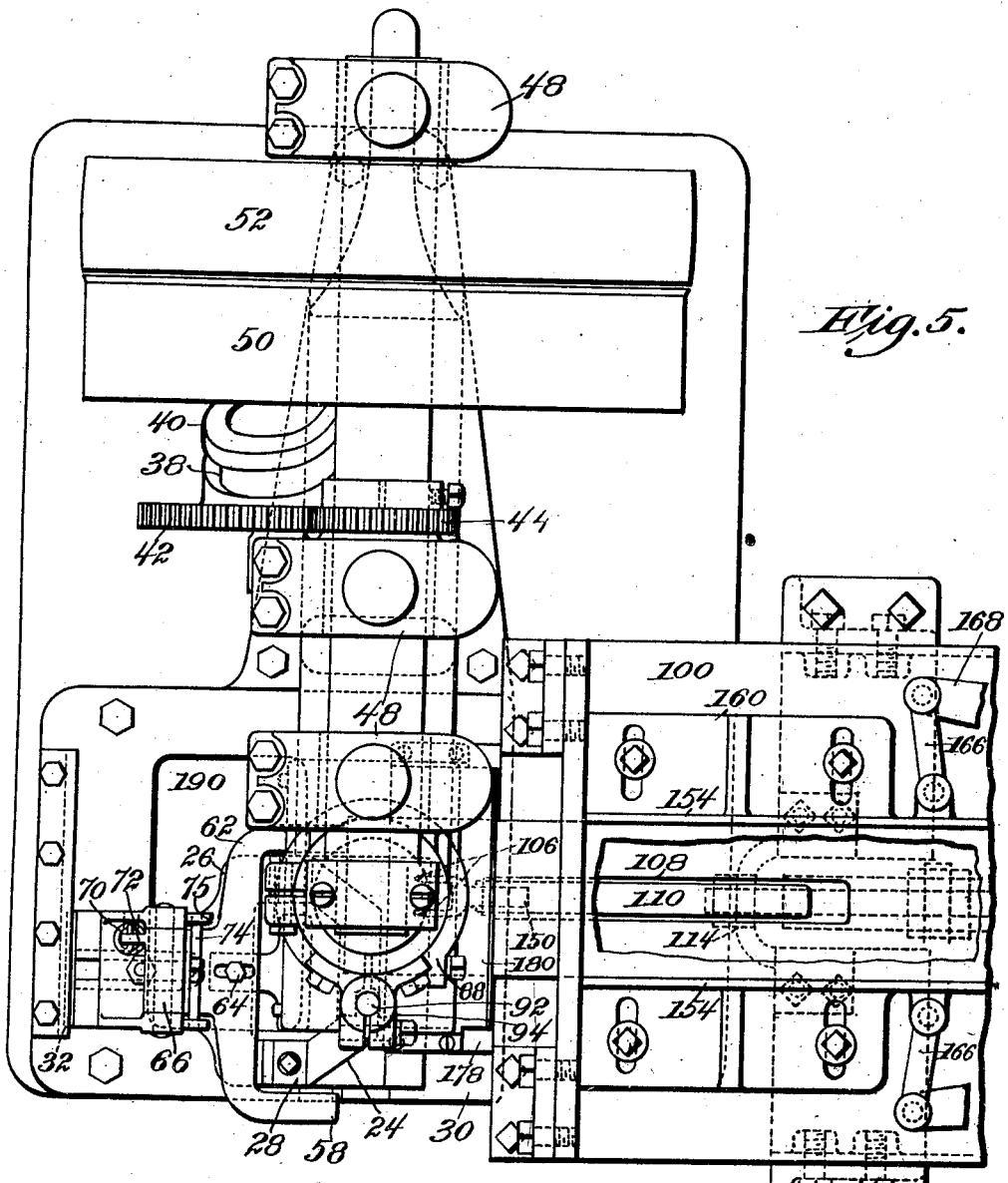
Figure 6:
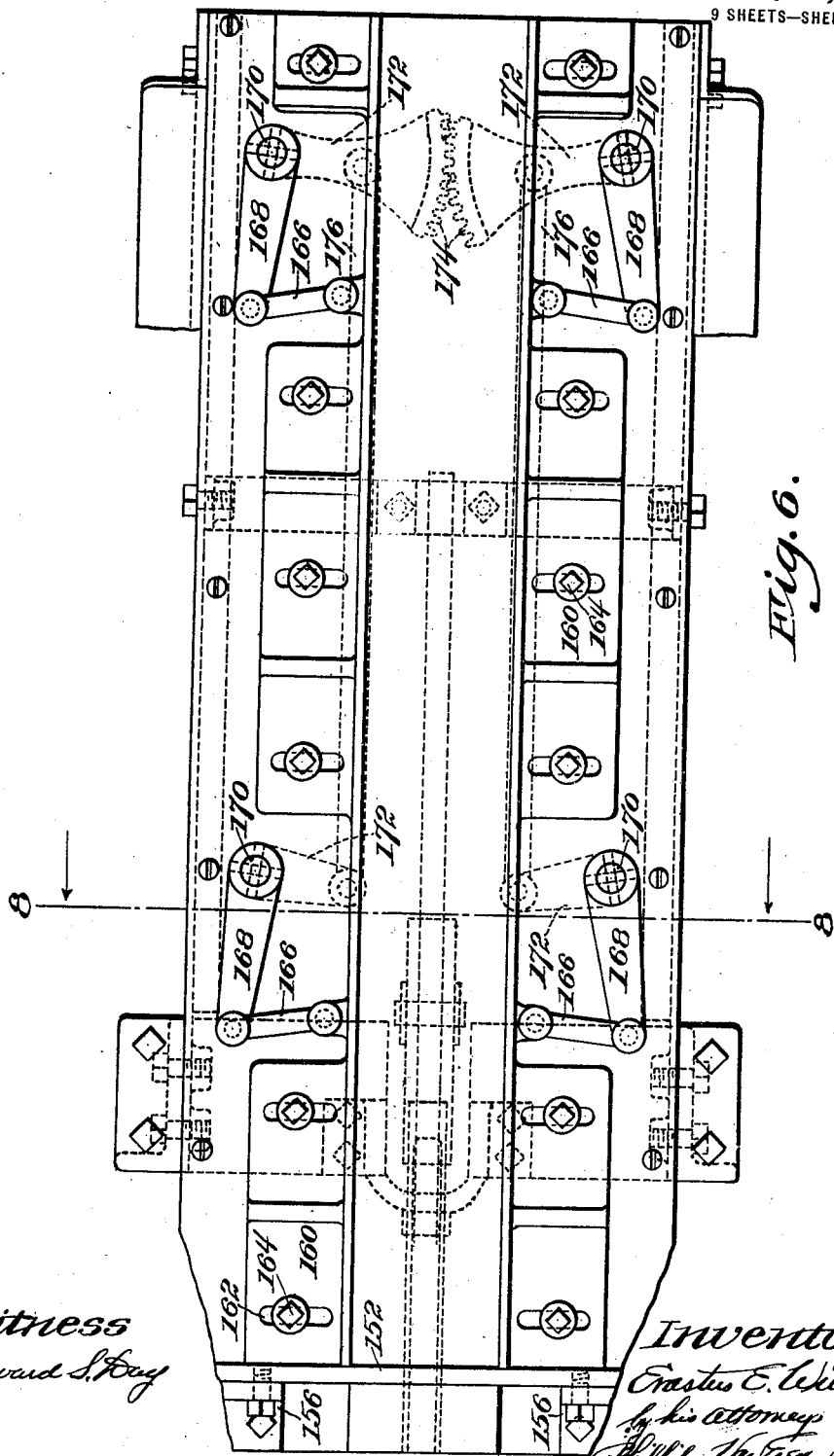
Figure 7:
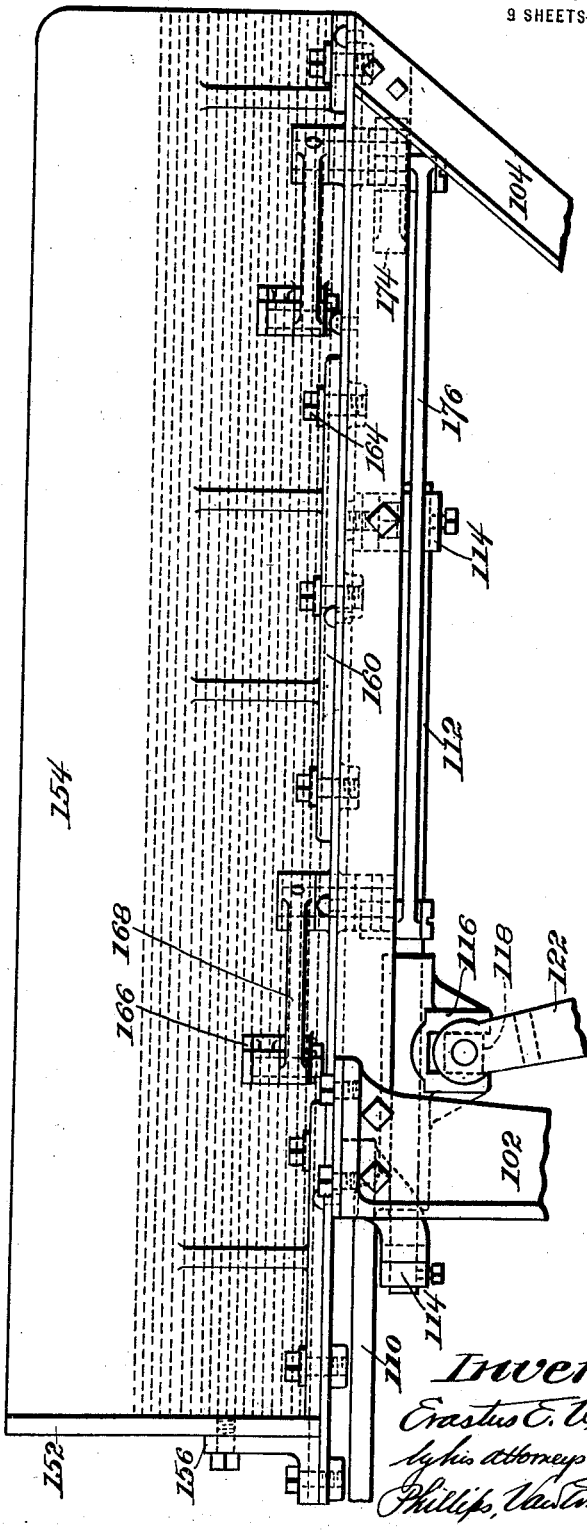
Figure 8:
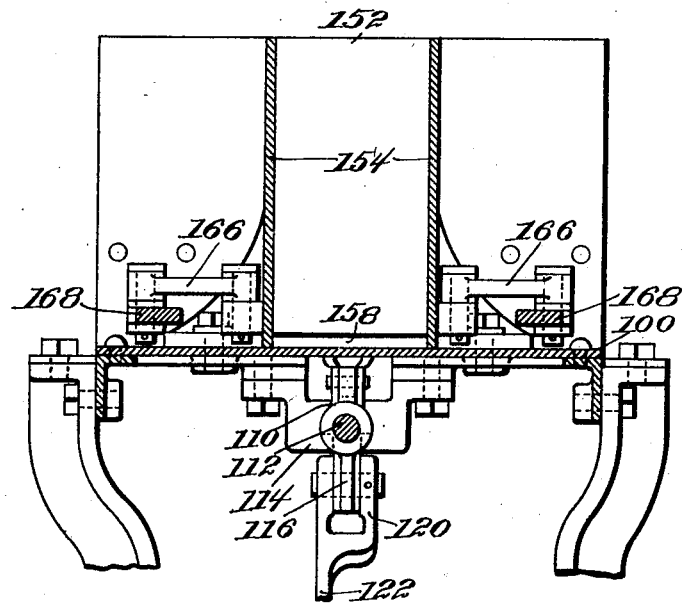
Figure 9:
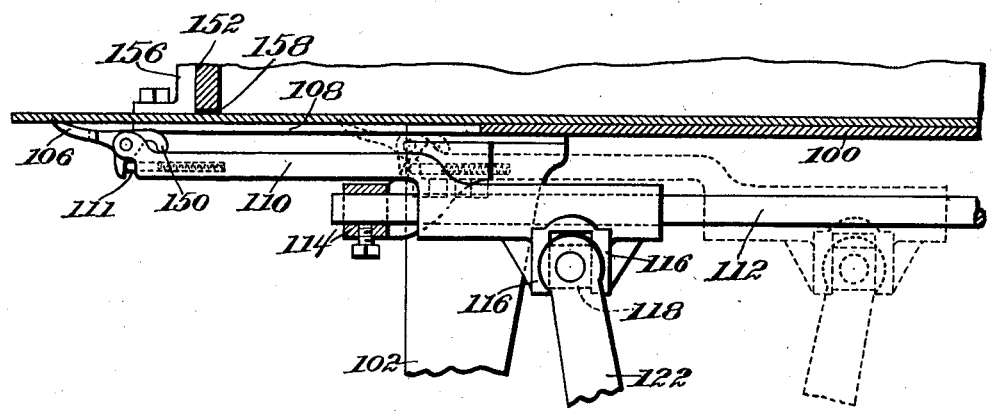

The preferred form of the invention is illustrated in the accompanying drawings, in which Figure 1 is a view, in front elevation, of the stock cutting machine; Fig. 2 is a view in side elevation of the machine shown in Fig. 1; Fig. 3 is an enlarged view in front elevation, of the upper part of the machine, illustrating the improved feeding mechanism; Fig. 4 is an enlarged view in side elevation, of the upper part of the machine, showing the blank cutting mechanism; Fig. 5 is a top plan view of the machine with parts broken away; Fig. 6 is a top plan view of the magazine for supporting strips of stock; Fig. 7 is a view, in side elevation, of the magazine shown in Fig. 6; Fig. 8 is a vertical, sectional view, of the magazine, taken on the line 8—8 of Fig. 6; Fig. 9 is a vertical section, through the bottom of the magazine, illustrating the feeding mechanism; Fig. 10 is a horizontal section taken on the line 10—10 of Fig. 4, showing the mounting of the cutter; Fig. 11 is a plan view of the cutter-carrier; Fig. 12 is a vertical section of the cutter-carrier taken on the line 12—12 of Fig. 11; Figs. 13, 14 and 15 are diagrammatic views illustrating the different positions assumed by the cutter and stops during the blank cutting operation; and Fig. 16 is a diagrammatic view of a strip of stock illustrating the position of the cuts made by the machine in forming blanks.

In the embodiment of the invention illustrated in the drawings, heel lifts are cut from sheet stock which previously has been stripped to a width which will just form two rows of polygonal lifts of the desired size arranged back to back. The cutter for cutting the strip into heel lifts has three connected, straight cutting blades 20, 22, and 24, see Figs. 10, 11 and 12. The blades 20 and 24 form obtuse angles with the intermediate blade 22 and are of the same size, but oppositely arranged. The apex of each angle forms a back corner of each polygonal lift and its sides form adjoining sides of the polygon. The straight sides of the strip being cut into lifts form the breasts of the individual lifts. All of the cutting blades of the cutter have a length greater than the length of the side of any polygonal blank to be formed, so that only the apexes of the angles need be accurately positioned in making the cuts. The cutter which has a dove-tailed shank is mounted below the work in a carrier 26 and is locked in position in an undercut slot 27 in the carrier (Fig. 12), by a pair of bevel-ended clamps 28.

The cutter is shifted transversely of the stock preparatory to each cutting operation to be positioned for alternately completing the formation of a blank in each row at each cutting operation. To this end the cutter carrier 26 is slidably mounted upon the bed 30 of the machine frame, having a dove-tailed sliding connection 31 at one side under the cutter and a tongue and groove sliding connection 32 at the other side (Figs. 1 and 3). To move the cutter carrier 26 a link 33 is connected between pairs of ears 34, formed, respectively, on the rear edge of the cutter carrier and the lower end of a cam lever 35 (Figs. 4 and 10). The cam lever is fulcrumed centrally on the machine frame and upon its upper end is mounted a roll 36 which works in a cam groove 38 in a rotary cam drum 40. A gear 42 (Figs. 3 and 4) is formed on the drum 40 which meshes with a gear 44 fixed on the main driving shaft 46. The main driving shaft is journaled in a series of bearings 48 of the machine frame and carries a loose pulley 50 and a tight pulley 52. During the operation of the machine the main driving shaft is continuously rotated so that the cutter carrier is continuously operated to be shifted back and forth transversely of the strip of stock.

In shifting the cutter transversely of the stock, the apexes of the angles formed by the cutting blades are accurately positioned relatively to the center line of the strip. The relative positions of the apexes vary, however, with different sizes and styles of blanks, and, in order to equip the machine for cutting different sizes and styles of blanks the link 33 (Fig. 4) is adjustably connected with the cam lever 35 by means of a bolt 54 and slot 56. By means of this adjustment the throw of the knife can be varied to properly locate its apexes for cutting different sizes and styles of blanks.

The strips of stock are automatically fed past the knife preparatory to making each cut, and since each cut completes the formation of a blank which has been partially formed by a preceding cut, it is necessary that the stock be accurately positioned. The position of the strip is determined by stops which are located in front of the cutter and hold the stock in a predetermined position relatively to the cutter. The novel design of the cutting blades shapes the front edge of the strip so that it always has the side of a blank in one row in advance of the side of a blank in the other row (Figs. 14 and 15). To provide for positioning such an end formation, a pair of side stops 58 are used to engage the blanks in separate rows and a central stop 60 is used to engage the blanks in both rows, (see Figs. 10, 13, 14 and 15). With this construction the stock is always moved into contact with the central stop and one of the side stops. The central stop 60 always engages the leading blank and is adjustably mounted upon the side stop plate 62 by means of a slot and bolt 64 to provide for different widths of blanks. While it is desirable to employ both the central and a side stop in positioning the strip, either of these stops could be used alone for positioning the strip. The side stop plate 62 (Figs. 1, 3 and 10) is bolted to a squared block 66 which is pivotally mounted in a standard 68 that is attached to the cutter carrier 26. The side stops 58 are normally held in the plane of travel of a strip by means of a spring 70 which is connected between a lug 72 on the block 66 and a pin 67 in the standard 68. The normal vertical position of the stops is determined by the engagement of the stop plate 62 with a cross pin 74 mounted in lugs 75 formed on the front of the standard 68. When the cutting block, presently to be described, moves downward to cut the stock, the spring 70 permits the stops to yield downward below the edge of the cutter.

After the strip is positioned against the stops, a cutting block is moved down to engage the strip and force the cutter through it to form the blanks. The cutting block (Figs. 3 and 4), consists of a metallic cutting plate 76 attached by means of screws 78 to a dove-tailed slide 80 which is mounted in a groove in a plate holding block 82. The block 82 is rotatably mounted upon a stem 84 which is fastened into the lower end of a cylindrical slide 86 by a screw thread 87. The cutting block may be vertically adjusted to have its cutting plate 76 properly register with the edge of the cutter blades by rotating the stem 84 within the cylindrical slide 86. The adjusted position of the stem is maintained by means of a collar 88 which is clamped upon the screw and is provided with lugs 90 which loosely engage a pin 92 clamped in a bracket 94 on the machine frame. With this construction the block and collar may reciprocate with the cutting block and the pin 92 will prevent them from rotating. In order to reciprocate the cylindrical slide 86 to operate the cutting block a pitman 96 is connected between a yoke 97, mounted within the slide 86, and an eccentric 98 formed on the end of the main driving shaft 46.

The strips of stock are advanced across the cutter after each stroke of the cutting block by a stock feeding device which is constructed to prevent either an overfeed or underfeed of the strip. The strip is positioned upon a table 100 (Fig. 1) which is supported at its forward end by brackets 102 and at its rear end by brackets 104, (see also Fig. 2), the brackets being secured to the side of the machine frame. To feed the strip a pair of feed teeth 106 project through a slot 108 in the table 100 (Figs. 5 and 9), and stick into the bottom of the strip to grip it for feeding. The feed teeth 106 are pivotally mounted upon the forward end of a feed slide 110 (see Fig. 9), and are normally held in a position to pierce the stock by a spring pressed plunger 111 which is seated in the end of the feed slide. The feed slide is mounted upon a guide rod 112 which is fixed in brackets 114 (Fig. 7), attached to the bottom of the table 100. The feed slide is periodically in a path extending from a point beneath and adjacent the advanced end of the strip to a point adjacent the cutter to intermittently grip the stock and advance it into engagement with the stops. The reciprocation is obtained by the following connections. On the bottom side of the feed slide 110, a pair of lugs 116 form a slot in which is a slide block 118 (dotted lines, Figs. 7 and 9). The block 118 is pivotally mounted between a yoke 120 formed on the upper end of a feed lever 122 (Fig. 8). The feed lever is loosely mounted upon a rock shaft 123 (Figs. 1 and 2) which is journaled in bearings 125 attached to the brackets 104. A continuously oscillated distance arm 124 is fixed on the rock shaft 123 and is arranged to be operatively but breakably connected with the feed lever 122 by means of a latch 126 which is pivoted on the feed lever and has a hooked end 128 to engage a pin 130 on the distance arm.

The hook is held in engagement with the pin 130 by means of a spring-pressed plunger 132 which is mounted in a block 134 attached to the side of the distance arm 124 so that in normal condition the feed lever will move when the distance arm is moved. To rock the shaft 123 in giving an oscillating movement to the distance arm, an arm 136 is fixed on the rock shaft 123 and connected by means of a link 138 with an arm 140 fixed on a rock shaft 142 which is journaled in the machine frame. An arm 144 is also fixed on the rock shaft 142 and connected by means of a link 145 at the rear of the machine (see Fig. 2), with an eccentric 146 formed on the rear end of the main driving shaft 46. With this construction the eccentric 146 imparts a continuous reciprocatory movement to the feed slide 110.

Upon each forward stroke of each cycle of operations of the feed slide the feed teeth 106 pierce the strip to get a feeding grip but the teeth are prevented from penetrating too deeply by a stop 150 (Fig. 9), which is formed on the rear end of the feed teeth and shaped to engage the slide 110 and to limit the upward movement of the feed teeth. Upon the rearward stroke of the feed slide, the feed teeth yield against the plunger 111 and are thus withdrawn from the strip and dragged backward against its bottom face. The feeding stroke imparted to the distance arm 124 by the eccentric 146 is designed to give the feed slide a greater length of throw than the width of the largest blank to be cut. Accordingly, when the strip is advanced by the feed slide and is brought into engagement with the stops 58 and 60 the feed slide and feed lever 122 are held from further movement, but the excess movement of the distance arm 124 is permitted by reason of the latch connection 126 which at this time yields against the plunger 132 to withdraw its hook 128 from engagement with the pin 130 and disconnect the distance arm from the feed lever 122. During the first portion of the return stroke of the distance arm 124 it will move relatively to the feed lever 122 until the hook 128 of the latch 126 is brought into engagement with the pin 130 and then the feed lever and feed slide will move with the distance arm and be drawn back into position to secure a new grip on the strip for the next feeding stroke. The stops positively act to prevent an overfeed of the strip and the excess movement of the distance arm acts to prevent an underfeed of the strip so that the strip is accurately positioned with relation to the cutter for each stroke of the cutting block.

The strips are supported on the table in a stack within a magazine which has guides that are relatively adjustable to accurately position the strips with their center line coinciding with the center line of the cutting block. The magazine (Figs. 2, 6, 7 and 8), consists of a front wall 152 which is secured to the front end of the table 100 and a pair of adjustable guides 154 which are mounted to move transversely of the table. The front wall 152 is rigidly fixed to the table by means of a pair of brackets 156 (Figs. 6 and 9), and is provided at its lower edge with a separating slot 158 which is used to regulate the number of sheets being advanced at one time to the cutter.

The guides 154 are formed on a series of bases 160 which slide upon the table 100. The transverse movement of the guides is controlled by a series of slots 162 which receive pins 164 secured in the table 100. The guides 154 are connected together to have a parallel receding and approaching movement to position the strips centrally of the cutting block. To obtain a simultaneous movement of the guides two links 166 (Fig. 6) are pivoted to each of the guides and connected by arms 168 to studs 170 which are pivoted in the table 100. The studs 170 project down through the table and upon their lower ends are pinned arms 172. The arms 168 are pinned to the studs 170 so that the arms 168 and arms 172 virtually form bell cranks. Intermeshing gear segments 174 are formed on the two arms 172 at the rear end of the magazine. The gear segment arms 174 are connected to the forward arms 172 by means of parallel rods 176 so that any movement of the arms 172 will be imparted to the segments 174. When the slides have been adjusted to center the strips on the table they may be locked in position by setting several of the pins 164.

The forward end of the table does not extend up to the edge of the cutter so that a guiding section is placed between the cutter and the end of the table (see Figs. 3 and 4). The guiding section consists of a guiding plate 178 which forms a continuation of the table 100 and a cover plate 180 attached at each side of the plate 178, the central portion of the cover plate being spaced above the plate 178 to form a slot for the passage of the strip (see Figs. 1, 3 and 4). The guiding plate 178 is mounted on a pair of bolts 182 which extend down through openings in the bed of the machine. The guiding section is normally held in position to form a continuation of the table 100 by means of a pair of springs 184 which surround the bolts 182 and are mounted between the machine bed 30 and the bottom of the plate 178. The plate 178 is slotted at 186 to form a continuation of the slot 108 in the table 100 in which the feed fingers 106 may move in feeding the strips to the cutter. The forward edge of the guiding section extends closely to the edge of the knife and serves to support the end of the strip in cutting the last blank from the strip. It will be seen from Figs. 1 and 3 that the feed fingers move up close to the edge of the knife and the spring-pressed plunger 111 of the feed teeth will tend to clamp the stock against the cover plate 180. In this way a very short end of stock can be held above the cutter. The normal position of the guiding section is above the plane of the cutting edge of the knife, but due to its yielding mounting on the springs 184, it, as well as the feed stops 58 and 60, is depressed below the level of the cutting edge of the knife when the cutting block descends to cut the stock. As soon as the cutting block is withdrawn the guiding section and stops are immediately brought back by their respective springs into normal operative position preparatory for the next cutting operation. In this way the blank is free to drop by gravity away from the knife as soon as cut and provision is made for supporting the last end of the strip of stock so that all of it can be cut into blanks.

Assuming that a plurality of strips of stock which have been previously cut to a width which will just make two rows of blanks of the desired size are stacked in the magazine, the guides 154 are adjusted to center the strips relative to the cutting block and the machine is set into operation. As the pivotally mounted feed finger 106 is actuated from its dotted line position adjacent the advance end of the magazine toward its full line position adjacent the cutter, as shown in Fig. 9, the feed teeth penetrate the lower surface of the lowermost strip in the magazine and feed it forwardly until it is brought into engagement with the stops, whereupon the latch connection 126 is permitted to yield to effect the disengagement of the distance arm 124 from the feed lever 122. The stock therefore is properly positioned against the stop for the cutting operation and the excess of movement of the distance arm 124 is permitted by reason of the disengagement above referred to. As the feed finger moves forward beyond the guard plate 152 of the magazine, the upper plate 180 of the yielding support serves to hold the strip down into feeding relation with the finger.

When the stock is in position to be acted upon by the cutter, the cutter block descends to cut a blank and in so doing the upper and lower supporting plates 180 and 178 are engaged by the cutting block and forced downwardly against the action of the yielding springs 184, while at the same time, the yieldingly mounted stops are also depressed. Just previous to the cutting operation, the feed finger 106 is retracted to its dotted line position to get a new grip on the strip to be fed, so that the feed mechanism is withdrawn from the path of movement of the yielding support as it is depressed. When the cutting block is raised, the cutter and stops are shifted transversely of the strip into position preparatory for the next succeeding cutting operation, and at the same time, the feed finger is again advanced to longitudinally feed the strip through another step of equal length into cutting position.

This cycle of operations continues until the lowermost strip is moved in a series of equal steps out of the magazine. So long as any portion of this lowermost strip remains within the magazine, the stack of strips above it is held up in its raised position so that the feed finger 106, which is prevented from rising beyond a predetermined amount by the engagement of its abutment 150 with the slide 110 and, moreover, has but a limited movement beneath the advance end of the magazine, is incapable of engaging and feeding the strip next above the lowermost strip being acted upon. When, however, the lowermost strip has been fed beyond the guard plate 152, the stack of strips is permitted to descend by gravity to bring the next strip down upon the supporting plate 100 and into the region of the operation of the reciprocating finger 106. Therefore, on the next reciprocations of this finger, the next succeeding lowermost strip is engaged and intermittently fed in a series of steps to cutting position. In this way the several strips are successively acted upon and uninterruptedly fed in abutting end to end relation to the cutting instrumentalities.

The heel lifts illustrated in the drawings are formed as follows: Referring to Figs. 13, 14, 15 and 16, when a new strip of stock is placed in the machine, and fed against the stops, as shown in Fig. 13, the first stroke of the cutting block will make the imperfect lift 1. In making the lift 1, cuts 1' will be formed for lifts 2 and 3. The cutting block will then be removed, the cutter shifted transversely of the strip and the strip advanced longitudinally so that the strip and cutters will assume the position of Fig. 14. On the second stroke of the cutting block, sides 2' will be formed on the lifts 2, 3 and 4. The cutting block will then be removed, and the cutter and stock relatively moved to set the strip and cutter in the position shown in Fig. 15. Upon the third stroke of the cutting block the sides 3' will be formed on the lifts 3, 4 and 5.

By this method of cutting, a blank from one of the rows will be severed with each stroke of the cutting block and the blanks will be severed alternately from the two rows. It will be noted by the above method that each blank produced has sides which are formed by three separate cutting operations and one cut will serve to form sides of adjoining blanks in both rows. No material, therefore, is wasted in the formation of contiguous blanks.

When the cutting block descends, the stops and guiding section yield downwardly to the level of the cutting edge of the knife and the blank produced falls away through openings 188 and 190 in the cutter carrier and bed of the machine and is caught in a suitable receptacle placed under the opening 190. In this way the blanks are removed by gravitation and do not interfere with the operation of the machine.

While the machine described in the drawings is particularly adapted for cutting heel lifts, it is not limited to use in making blanks for this article alone, since it will be apparent to those skilled in the art that other shoe blanks can readily be produced by the same method.

The type of cutter illustrated can be used for cutting all sizes of one style of heel lifts and, since the general outline of heel lifts does not vary greatly, the same knife can generally be used for cutting the different sizes of all the various styles of lifts. In case the angular faces 2', 3' shown in Fig. 13 are not exactly tangent to the edge of the finished lift, the excess material left at the three rear corners of the lift is sufficient to provide for the slight variations of the angular relations of the sides 2', 3' for different styles of lifts. For this reason, a large majority of lifts can be obtained with the present inventor's novel type of knife. It will be noted that all of the cuts are made with straight edges, thus making it comparatively easy to keep the knife in sharp condition and proper angular adjustment.

In the specification and claims the terms "front", "rear" and "forward" are used to denote positions of parts with relation to the direction of feed of the stock. In the following claims, however, all references to position or direction of movement of the elements are to be interpreted as terms of designation and not of limitation, as obviously, it is the relative position or relative direction of movement which alone is of importance.

Having thus described the invention, what is claimed as new, is:

1. A machine for cutting shoe stock having, in combination, a support for positioning a sheet of stock, a cutter, a cutting block coöperating with the cutter, means to relatively move the cutter and block to make a cut, a stop movable with the cutter for determining the longitudinal advancement of the stock preparatory to making a cut, means to relatively move the cutter and stock transversely of the support before making each cut to position the cutter for cutting a blank, and means for advancing the stock.

2. A machine for cutting shoe stock having, in combination, a support for sheet stock, a cutter, a cutting block coöperating with the cutter, means to relatively move the cutter and block to make a cut, a stop for determining the longitudinal position of the stock, located in front of the cutter the distance of one-half of the width of the blank to be cut, means to relatively move the cutter and stock transversely of the support preparatory to making each cut, and means to advance the stock against the stop to position the stock for cutting a blank.

3. A machine for cutting shoe stock having, in combination, a support for sheet stock, a cutter, a cutting block coöperating with the cutter, means to relatively move the cutter and block to make a cut, a stop for determining the position of the stock to cut a blank from the stock, located the width of a blank in front of the cutter, means to relatively move the cutter and stock transversely of the support to set the cutter for cutting each blank, and means to advance the stock against the stop.

4. A machine for cutting shoe stock having, in combination, a support for strips of stock, a guide for positioning the strips on the support, a cutter having a series of connected angularly arranged straight blades, a cutting block coöperating with the cutter, means to relatively move the cutter and block to make cuts, means to relatively move the cutter and stock transversely of the support to position the stock for cutting a strip into two rows of blanks, means to longitudinally advance the stock, and means in front of the cutter to engage the stock of each row of blanks to determine the longitudinal advancement of the stock.

5. A machine for cutting shoe stock having, in combination, a support for sheet stock, a cutter, a cutting block coöperating with the cutter, means to relatively move the cutter and block to make cuts, means to relatively move the cutter and stock transversely of the support to position the stock for cutting blanks, means to longitudinally advance the stock, a stop for determining the longitudinal advancement of the stock, and means to relatively move the stop and stock transversely of the support to set the stop for positioning the stock.

6. A machine for cutting shoe stock having, in combination, a support for sheet stock, an angular cutter, a cutting block coöperating with the cutter, means to relatively move the cutter and block to make cuts, means to relatively move the cutter and stock transversely of the support preparatory to making each cut, a stop projecting into the path of movement of the stock to positively stop the stock in a predetermined position relatively to the cutter, said stop being adjustable to position the stock for cutting different sizes of blanks, and a yieldable feeding means to advance the stock up against the stop, whereby different sizes of blanks can be cut with the same cutter.

7. A machine for cutting shoe stock having, in combination, a support for sheet stock, means to feed the stock, a cutter, means for shifting the cutter transversely of the support to position the cutter for cutting a row of blanks from each half of the stock, side stops in front of the cutter for determining the position of the respective halves of the stock, a central stop in front of the cutter for determining the position of both halves of the stock, a cutting block coöperating with the cutter, and means to relatively move the cutter and block to cut blanks from the stock.

8. A machine for cutting shoe stock having, in combination, a support for sheet stock, a cutter, a cutting block coöperating with the cutter, means to actuate the block to cut blanks from the stock, means to feed the stock across the cutter, means to shift the cutter transversely of the support to position the cutter for cutting a row of blanks from each half of the stock, side stops in front of the cutter for determining the position of the respective halves of the stock, a central stop in front of the cutter for determining the position of both halves of the stock, said stops being relatively adjustable, and means to actuate the stops to set them for positioning the stock.

9. A machine for cutting shoe stock having, in combination, a cutter, a cutting block coöperating with the cutter, a support for sheet stock over which the stock is fed to the cutter, means to relatively move the cutter and block to make a cut, means to relatively move the cutter and stock transversely of the direction of feed preparatory to making each cut, and means to vary the relative movement of the cutter and stock transversely of the direction of feed.

10. A machine for cutting shoe stock having, in combination, a support for sheet stock, a cutter, a cutting block coöperating with the cutter, means to relatively move the cutter and block to make a cut, means to relatively move the cutter and stock transversely of the support preparatory to making each cut, means to relatively move the stock and cutter longitudinally of the support preparatory to making each cut, and means to vary the relative longitudinal and transverse movements of the cutter and stock in cutting different sizes and styles of blanks.

11. A machine for cutting shoe stock having, in combination, a support for sheet stock, a cutter carrier, a cutter in said carrier, a stop on said carrier, means to reciprocate said carrier transversely of the support to position the cutter for making successive cuts, means to advance the stock against the stop, a cutting block, and means to relatively move the cutter and block to cut blanks from the stock.

12. A machine for cutting shoe stock having, in combination, a support for strips of stock, a cutter, a cutting block coöperating with the cutter, means for relatively moving the cutter and block to make cuts, means to move the cutter transversely of the support to position the cutter for making cuts, and relatively adjustable connected guides for engaging opposite edges of the strips to position the stock on the support centrally of the cutting block.

13. A machine for cutting shoe stock having, in combination, a support for strips of stock, a cutter, a cutting block coöperating with the cutter, means to relatively move the cutter and block to cut blanks from the stock, a pair of guides for positioning the strips in stacked formation upon the support, connections between the guides to adjust them relatively to the center line of the cutting block, and means to intermittently advance strips to the cutter.

14. A machine for cutting shoe stock having, in combination, a support, a cutter, a cutting block coöperating with the cutter to cut shoe blanks, and means to relatively move the stock and cutter transversely of the support, and to longitudinally advance the stock one half the width of a blank to position the stock for making each cut.

15. A machine for cutting shoe stock, having, in combination, a support, a cutter, a cutting block coöperating with the cutter, means to relatively move the stock and cutter transversely of the support to cut blanks in two rows, means for longitudinally advancing the stock, and a stop for alternately engaging the stock of the two rows of blanks to limit the advance of the stock to one half the width of a blank.

16. A machine for cutting shoe stock having, in combination, a support for the stock, a vertically reciprocating cutting block, a stationary cutter coöperating therewith, means for feeding the stock to the cutter, means for shifting the cutter transversely relatively to the stock to position it for cutting a blank, and a stop movable with the cutter for determining the feeding movements of the stock preparatory to making a cut.

17. A machine for cutting shoe stock having, in combination, a support for the stock, a cutting block, a cutter, means for relatively moving said block and said cutter to make a cut, means for feeding the stock to the cutter, means for shifting the cutter transversely of the stock to position it for cutting a blank, and a stop located in front of the cutter the distance of one half of the width of the blank to be cut for determining the longitudinal position of the stock.

18. A machine for cutting shoe stock having, in combination, a support for the stock, a stationary cutter, a movable cutting block adapted to coöperate therewith for cutting a blank, means for feeding the stock to said cutter, means for shifting the cutter transversely of the stock to position it for cutting a blank, and a stop located the width of the blank in front of the cutter for determining the longitudinal position of the stock.

19. A machine for cutting shoe stock having, in combination, a support for the stock, a stationary cutter having a series of connected angularly arranged straight blades, a movable cutting block coöperating therewith, means for feeding the stock to said cutter, means for laterally shifting the cutter relative to the stock to position it for cutting the stock into two rows of blanks, and means in front of the cutter to engage the stock of each row of blanks to determine the longitudinal position of the stock.

20. A machine for cutting shoe stock having, in combination, a support for the stock, a reciprocating cutting block, a stationary cutter coöperating therewith, means for laterally moving the cutter with respect to the stock to position the cutter for cutting blanks, means for feeding the stock longitudinally to the cutter, a stop for determining the longitudinal position of the stock, and means for moving the stop transversely of the stock to set the stop for positioning the stock.

21. A machine for cutting shoe stock having in combination, a support for the stock, a reciprocating cutting block, a stationary angular cutter coöperating therewith, means for laterally moving the cutter with respect to the stock to position the cutter for cutting blanks, a stop projecting into the path of movement of the stock to positively stop the stock in a predetermined position relative to the cutter, said stop being adjustable to position the stock for cutting different sizes of blanks, and yieldable feeding means to advance the stock against the stop, whereby different sizes of blanks can be cut with the same cutter.

22. A machine for cutting shoe stock having, in combination, a support for the stock, a reciprocating cutting block, a stationary cutter coöperating therewith to cut blanks from the stock, means for feeding the stock over the support to the cutter, means for shifting the cutter transversely of the direction of feed of the stock alternately in opposite directions preparatory to making each cut to cause the cutter to cut contiguous blanks from the stock, and means to vary the transverse shifting movement of the cutter.

23. A machine for cutting shoe stock having, in combination, a reciprocating cutting block, a stationary cutter coöperating therewith to cut blanks from the stock, a support for the stock, means for longitudinally feeding the stock over the support to the cutter, means for shifting the cutter transversely of the direction of feed of the stock alternately in opposite directions to position it for cutting contiguous blanks from the stock, and means to vary the longitudinal movements of the stock and the transverse movements of the cutter in cutting different sizes and styles of blanks.

24. A machine for cutting shoe stock having, in combination, a support for the stock, a reciprocating cutting block, a stationary cutter carrier, a cutter mounted in said carrier and adapted to coöperate with said cutting block, a stop on said carrier, means for reciprocating said carrier to position the cutter and the stop for making successive cuts, and means for feeding the stock against said stop preparatory to each cut.

25. A machine for cutting shoe stock having, in combination, a support for strips of stock, a reciprocating cutting block, a stationary coöperating cutter, means for shifting the cutter transversely of the support to position the cutter for making cuts, and relatively adjustable guides for engaging opposite edges of the strips to position the stock on the support centrally of the cutting block.

26. A machine for cutting shoe stock having, in combination, a support for the stock, a reciprocating cutting block, a stationary cutter coöperating therewith for cutting blanks from the stock, and means for moving the cutter transversely of the support alternately in opposite directions, and longitudinally feeding the stock one half the width of a blank preparatory to each cutting operation to relatively position the cutter and stock to cut contiguous blanks from the stock.

27. A machine for cutting shoe stock having, in combination, a support, a reciprocating cutting block, a stationary cutter coöperating therewith for cutting blanks, means to move the cutter transversely of the support to cut two rows of blanks from the stock, means for longitudinally feeding the stock to the cutter, and a stop for alternately engaging the stock of the two rows of blanks to limit the feed of the stock to one half the width of a blank.

28. A machine for cutting shoe stock having, in combination, a reciprocating cutting block, a stationary cutter coöperating therewith for cutting blanks from the stock, a support for the stock, means for feeding the stock over the support to said cutter, and means for transversely shifting the position of said cutter alternately in opposite directions prior to each operative movement of said cutting block to position the cutter for cutting contiguous blanks from the stock.

29. A machine for cutting shoe stock having, in combination, a reciprocating cutting block, a stationary coöperating cutter in the form of a truncated V, a support for the stock, means for feeding the stock over said support to said cutter, and means for laterally reciprocating the cutter with respect to the stock.

30. A machine for cutting shoe stock having, in combination, a reciprocating cutting block, a stationary coöperating cutter, means for shifting the cutter transversely of the support to position it for cutting a row of blanks from each half of the stock, and side stops in front of the cutter for determining the position of the respective halves of the stock.

31. A machine for cutting shoe stock having, in combination, a support for the stock, a cutter, a cutting block coöperating therewith, means for feeding the stock over the support to the cutter, means for shifting the cutter transversely of the support to positions for cutting a row of blanks from each half of the stock, and side stops in front of the cutter and movable therewith for respectively determining the position of the respective halves of the stock.

32. A machine for cutting shoe stock having, in combination, a support for the stock, a reciprocating cutting block, a stationary cutter carrier, a cutter mounted thereon and adapted to coöperate with said cutting block, means for feeding the stock to said cutter, means for laterally reciprocating said carrier to position the cutter for making successive cuts, and a stop mounted upon said carrier against which the stock is fed, said stop being rigid in the line of feed and so constructed and arranged as to yield in a direction transverse thereto when engaged by the reciprocating cutting block.

33. A machine for operating on stock having, in combination, operating means, a magazine adapted to contain a plurality of strips of stock in superposed relation, and means disposed beneath said magazine for feeding each of the successive strips of stock in a series of steps of equal lengths and one at a time from the bottom of said magazine to said operating means.

34. A machine for operating on stock having, in combination, operating means, a magazine adapted to contain a plurality of strips of stock in superposed relation, and reciprocating means for feeding each of the successive strips of stock in a series of steps of equal lengths and one at a time from the bottom of the magazine to the operating means in end-to-end abutting relation.

35. A machine for operating on stock having, in combination, operating means, a magazine adapted to contain a plurality of strips of stock in superposed relation, and feed means disposed beneath the magazine and adapted to reciprocate continuously for operatively engaging the bottom face of the lowermost strip of stock and feeding it in a series of steps from the magazine to the operating means, said feed device being constructed and arranged to similarly act upon the succeeding strip only when the first strip has been fed completely out of the magazine.

36. A machine for operating on stock having, in combination, operating means, a magazine adapted to contain a plurality of strips of stock in superposed relation, and a periodically reciprocated impaling feed device disposed beneath said magazine and adapted to penetrate the bottom face of the lowermost strip of stock and feed it to the operating means at each forward movement, said feed device being limited in its upward movement to an extent which prevents it from acting upon the next succeeding strip until the first strip has been fed completely from said magazine.

37. A machine having, in combination, means for holding a stack of strips of stock, means adjacent said stock for operating intermittently upon successive portions of a strip, feeding means disposed beneath said stack and adapted to periodically reciprocate to and from said operating means continuously, and means for causing said feeding means to engage and feed the lowermost strip in the stack to said operating means in a series of steps, one step at each forward stroke, and to similarly act upon the succeeding strip after the first strip is fed completely from the magazine.

38. A machine for operating on stock having, in combination, operating means, a magazine adapted to contain a stack of strips of stock arranged in superposed relation, a reciprocating feed device disposed beneath said magazine for intermittently feeding the strips of stock to said operating means, and auxiliary means disposed between said operating means and said magazine for engaging the upper surface of the strip of stock being fed and holding it in operative relation with the feed device.

39. A stock cutting machine having, in combination, cutting means, a magazine adapted to contain a stack of strips of stock in superposed relation, means for intermittently feeding the successive strips from the bottom of said magazine to said cutting means, and guiding means disposed between said cutting means and said magazine and engaging the upper and lower surfaces of the strip for maintaining control of the strip being fed and guided it into cutting position.

40. A machine for operating upon stock having, in combination, means for holding a stack of strips of stock, means adjacent said holding means for operating intermittently upon successive portions of a strip, a single feed device disposed beneath the stack and adapted to periodically reciprocate to and from said operating means, and means for causing said feed device to operatively engage the lowermost strip in the stack at each forward stroke and feed it to the operating means in a series of steps.

41. A machine for operating upon stock having, in combination, means for holding a stack of strips of stock, means adjacent said holding means for operating intermittently upon successive portions of a strip, a single feed device disposed beneath the stack and adapted to periodically reciprocate to and from said operating means in an invariable path such that at each forward stroke it operatively engages the bottom face of the lowermost strip only in the stack to feed said strip in a series of steps to the operating means, the construction and arrangement being such that the next succeeding strip in the stack is supported by the lowermost strip above the invariable path of movement of said feed device so long as any portion of the lowermost strip being fed remains within the holding means and is permitted to drop into the region of operations of said feed device when the strip being fed is entirely removed from the holding means.

42. A machine for operating on stock having, in combination, operating means, a magazine adapted to contain a plurality of strips of stock in superposed relation, and a periodically reciprocating feed device disposed beneath said magazine for advancing the successive lowermost strips from the bottom of the magazine to said operating means one at a time and each in a series of steps, one step to each cycle of the reciprocating feed device.

43. A machine for operating on stock having, in combination, operating means, a magazine adapted to contain a plurality of strips of stock in superposed relation, and a periodically reciprocating feed device disposed beneath said magazine and having continuous movements throughout the full lengths of its forward feed strokes for feeding the lowermost strip of stock from the magazine to the operating means in a series of steps, one step to each forward stroke of said feed device.

44. A machine for operating on stock having, in combination, operating means, a magazine adapted to contain a plurality of strips of stock in superposed relation, a feed device disposed beneath said magazine and adapted to reciprocate continuously for feeding the lowermost strip of stock from the magazine to the operating means in a series of equal steps.

45. A machine for operating on stock having, in combination, a magazine adapted to contain a plurality of strips of stock in superposed relation, operating means disposed adjacent and beyond one end of said magazine, a feed device disposed beneath said magazine and reciprocable between a point beneath and adjacent the advance end of the magazine and a point adjacent the operating means for feeding each successive lowermost strip in a series of steps from the magazine to the operating means.

46. A machine for operating on stock having, in combination, a magazine adapted to contain a plurality of strips of stock in superposed relation, operating means disposed adjacent and beyond one end of said magazine, a feed device beneath said magazine reciprocable through a path of less length than that of the magazine for operatively engaging the bottom surface of the lowermost strip and feeding it to said operating means in a series of steps.

47. A machine for operating on stock having, in combination, a magazine adapted to contain a plurality of strips of stock in superposed relation, operating means disposed adjacent and beyond one end of said magazine, a feed device disposed beneath said magazine and reciprocable through a path of less length than that of the magazine between a point beneath and intermediate the ends of the magazine and a point adjacent the operating means for operatively engaging the bottom surface of each successive lowermost strip and feeding them one at a time in a series of steps to said operating means.

48. A machine for operating on stock having, in combination, a magazine adapted to contain a plurality of strips of stock in superposed relation, operating means disposed adjacent one end of said magazine, and an impaling feed device adapted to reciprocate continuously beneath said magazine and constructed and arranged to penetrate the bottom surface of the lowermost strip and effect its advance to the operating means at each forward stroke of said feed device.

49. A machine for operating on stock having, in combination, operating means, a magazine adapted to contain a plurality of strips of stock in superposed relation, and a periodically reciprocable feed device disposed beneath said magazine and adapted to intermittently engage the lowermost strip of stock and feed it one step toward the operating means at each cycle and to similarly act upon the succeeding strip only after the first strip has been fed completely from said magazine.

50. A machine for operating on stock having, in combination, operating means, a magazine adapted to contain a stack of strips of stock in superposed relation, and an intermittently operating feed device beneath the advance end of the stack for feeding the lowermost strip in a series of equal steps from the bottom of the stack to said operating means and for similarly feeding the next succeeding bottom strip when the lowermost strip being operated upon is fed completely out of the stack to permit said next succeeding strip to drop by gravity into the region of operations of said feed device.

ERASTUS E. WINKLEY.